United States Patent [19]
Cotugno et al.

[11] Patent Number: 6,079,047
[45] Date of Patent: Jun. 20, 2000

[54] UNWRAPPING SYSTEM AND METHOD FOR MULTIPLE FILES OF A CONTAINER

[75] Inventors: Lauren Ann Cotugno, Dove Canyon; Edward Henry Frankel, Rancho Cucamonga, both of Calif.

[73] Assignee: Unisys Corporation, Blue Bell, Pa.

[21] Appl. No.: 09/084,040

[22] Filed: May 22, 1998

[51] Int. Cl.[7] .................................................. G06F 11/10
[52] U.S. Cl. ........................ 714/807; 714/799; 713/202
[58] Field of Search .................................. 714/807, 799; 713/200, 202

[56] References Cited

U.S. PATENT DOCUMENTS 5,995,939  11/1999  Berman et al. .

*Primary Examiner*—Phung M. Chung
*Attorney, Agent, or Firm*—Alfred W. Kozak; Mark T. Starr; Steven B. Samuels

[57] ABSTRACT

Industry standard byte stream data files organized as a Container having a directory with multiple files on a Compact Disk are reconstituted to match the protocol of a first computer system's specialized native files in an integrated network where a second platform using standard byte stream Containers works in conjunction with a first platform having specialized native files. Specialized "Unwrap" commands are effectuated by two programmable interfaces to take the byte stream data Containers and re-translate them to native-style files applicable to said first platform's operating system.

13 Claims, 7 Drawing Sheets

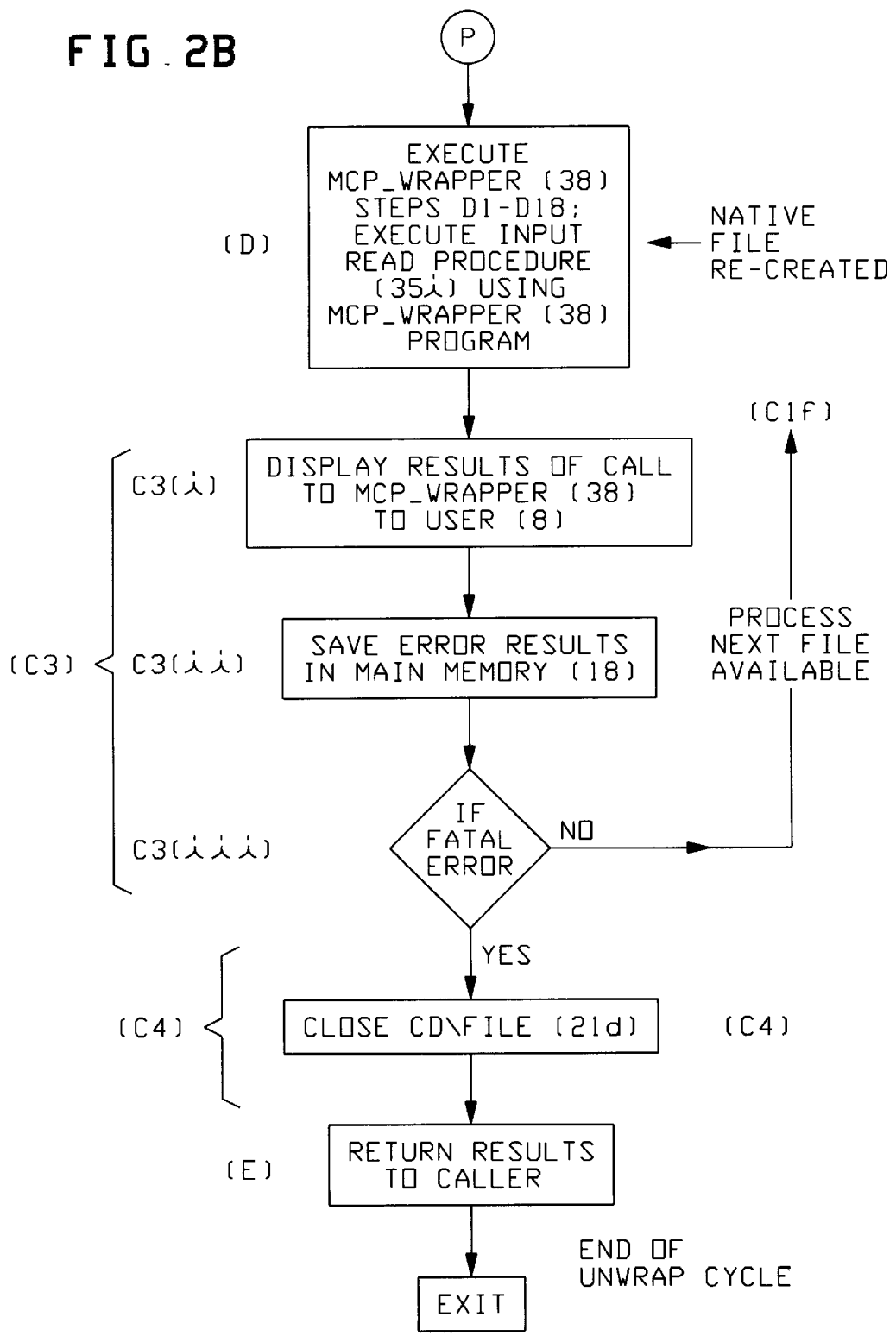

FIG. 3

| [i] | [ii] | [iii] | [iv] | [v] |
|---|---|---|---|---|
| "UNISYS000010" | <OPTIONS> | THE A SERIES DISK FILE HEADER+HEADER CHECKSUM | <THE FILE> | <CHECKSUM> AND OPTIONALLY, <DIGITAL SIGNATURE> |

FIG. 4

| [i] | [ii] | [iii] | [iv] | [v] | [vi] | [vii] |
|---|---|---|---|---|---|---|
| <CONTAINER ID> | <DIRECTORY LOCATION> | CONTAINER OPTIONS & CONTAINER CHECKSUM | THE WRAPPED FILES | <DIRECTORY ID> | <DIRECTORY OF FILE NAMES AND THEIR LOCATIONS IN CONTAINER> | OPTIONAL <DIGITAL SIGNATURE> |

UNWRAPPING SYSTEM AND METHOD FOR MULTIPLE FILES OF A CONTAINER

CROSS-REFERENCES TO RELATED APPLICATIONS

This application is related to a co-pending application entitled "Method and System for Wrapping Multiple Files to a Container for Burning Into Compact Disk", filed on Feb. 20, 1998, and assigned Ser. No. 09/026,743 (Docket 041-434-L), which application is incorporated herein by reference. This application in further related to co-pending applications U.S. Ser. No. 08/962,468 entitled "Method and System for Wrapping Single Files for Burning into Compact Disk" and U.S. Ser. No. 08/989,738 entitled "System and Method for Unwrapping a Single File From a Compact Disk for Utilization by Various Computer Platforms", which are also incorporated herein by reference.

FIELD OF THE INVENTION

This disclosure refers to methods of decoding or unwrapping text stream data files in a Container from a compact disk which reside in a standard format so that they may be converted into original, native proprietary type files of a Container usable on a specialized computer system.

BACKGROUND OF THE INVENTION

In the usage of modern computer systems and networks, the situation arises where systems having one proprietary protocol and data format are connected to systems having different data formats and protocols. Thus in order to provide for system integration in different networks, it is necessary that there be provided a system or method whereby the data formats of a first system can be transferred to and utilized by the network of a differently oriented system.

For example, the Unisys A Series computer systems involve a Central Processing Unit and memory together with storage such as disk storage which operates under the control of a Master Control Program. These A Series systems use a particular native format for the data files compatible with the A Series software which can be placed on CD-ROMs. Thus, the CD-ROMs which contain this A Series software contain an image of a formatted tape which can be utilized only by the A Series systems. However, when it is desirable to integrate a first system such as the A Series systems for operation with other platforms such as an NT system or a UNIX system, then problems arise in that the second system such as the NT system, utilizes formats which are not compatible with the software formats of the A Series system (first system).

In earlier operations, the software for a first system, such as an A Series system, was utilized by providing methods to burn CD disks from a Library Maintenance formatted tape. This method had the limitation in that it limited the type of files that were burned into the CD-ROMs to those of the "native A Series" files.

Now, in order to provide for system integration where a first platform, such as an A Series system, is to be coupled to a second platform such as a Microsoft NT system or a UNIX system, which integrated system would be designated as a Unisys ClearPath system, the desirability here would be to make and use a single CD-ROM disk which would carry both the A series software and at the same time carry the NT software.

Thus in this regard, a method is needed to couple the A Series files (with their native attributes) and also arrange them in a format capable of being stored on a particular media such as a CD-ROM which will also hold the readable software for the NT (or other) system.

The A Series systems have files with specialized attributes which are designated for example, as FILERIND, CREATIONDATE, and RELEASEID, as indicated in the Glossary.

As a result, the Unisys A Series systems will provide a programmatic interface to its Master Control Program (MCP) which will provide a mechanism for "wrapping" and for "unwrapping" files.

"Wrapping" is a term which is used to define the process of packaging an A Series file, along with its Disk File Header information and a checksum (and optionally a digital signature), as a byte-stream data file, so that it can be transported across heterogeneous networks and non-A Series specific media, while still maintaining its native A Series attributes.

"Unwrapping" is a term used to define the process of taking a previously "wrapped file" and coupling it with the information from its original Disk File Header (DFH) in order to restore the original native A Series file, as it existed prior to being wrapped.

Thus, the problem of limitations in a software file format which is oriented to one system, can now be transformed in order to provide a format that is utilizable not just for a first system, but also for a first and second system, whereby the file format of the second system would not ordinarily be compatible with that of the first system.

One of the problems involved in the utilization of computer systems and personal computers has to do with the distribution of software. Once a customer has purchased or begun a license key, he is then able to make use of the Wrap and Unwrap commands. The code for these commands is in the Master Control Program (MCP). The Unwrap command is readily available to all Users. The Wrap command is enabled when the User applies the license key.

The Wrap/Unwrap feature makes software distribution easier for vendors who sell and distribute Unisys A Series software. It also enables A Series sites to store volumes of files off-line by wrapping them into containers, then copying the containers to a PC (personal computer) and then burning the container files on to a compact disk-ROM (CD-ROM). This provides an efficient system for storing old source files, object files and data files when archiving or retiring an old application system. This is also useful when archiving old files that are sometimes left by programmers on old disk families.

While the co-pending U.S. Ser. No. 09/026,743 provided a method for encoding (wrapping) multiple files of a container for transfer to another type of computer platform, then later, the "Unwrap" method algorithm shown herein, enabled one to decode the multiple files of the container utilizing another A Series platform (first system) and restore the files to their original form. Thus, source files, data files, and code files can all be wrapped, copied, and later "unwrapped", using a single platform or an integrated platform, for subsequent usage. It should be noted that the encoding process preserves the original A Series file attributes of the multiple files, which can later be decoded.

The method of providing native first system files, on a compact disk (CD) as a text byte stream data file, which is compatibly combined with industry standard text NT data files, and the subsequent usage of this text stream data file (on the compact disk, CD) by "unwrapping" the information from the CD, is done through two WFL (Work Flow Language) commands. Thus, the command to encode a file for transfer is called "WRAP". The command for decoding the particular file is called "UNWRAP".

The "encoding" process is called "wrapping the file", and the end result of the "WRAP" command is called a "wrapped file".

The "decoding" process is called "unwrapping the file" and the end result is the normal original first platform native file that one had originally started with on the first platform, such as the Unisys A Series platform.

There are two ways in which files can be wrapped. These include: (i) as stand-alone wrapped files; and (ii) in container files.

A "stand-alone wrapped file" contains a single file. It contains attribute information, verification information, and the data of the file itself.

A "container file" contains many files. It is similar, in concept, to a Library/Maintenance tape image as provided by Unisys Corporation. There is a directory part which describes the files in the container, and then the files themselves along with their respective headers follow this.

Files can be wrapped into either stand-alone files, or into container files. However, each one of these choices will have its own particular applications.

Files are always wrapped to Unisys A Series disk files. A wrapped file has a FILEKIND of WRAPPEDDATA.

A container file has a FILEKIND of CONTAINERDATA. These files are stored in a text stream format, which is ideally useful for FTP (File Transfer Protocol) in file transfer operations.

Wrapped files and container files can efficiently be transferred to other operating systems for storage on other media, particularly on CD-ROM's. When done properly, the files can be read directly back onto any Unisys A Series machines (first platform) by simply placing the compact disk (CD) into the A Series CD-ROM reader, and then "Unwrapping" the file or files from there. It is also possible to upload the wrapped file via file transfer protocol (FTP) to the user's A Series disk and "Unwrap" it from there as well. Similarly, in an integrated ClearPath Network involving a second platform (NT or UNIX) and first platform (A Series), the CD industry standard file can be unwrapped for utilization by the A Series platform and concurrently used to load the (NT or UNIX) system (second platform).

The present disclosure involves the "unwrap" operation, whereby there are provided methods giving the ability to restore multiple files of a container that were previously combined with their computer system attributes into text stream data files, and which were burned onto industry-standard CD-ROM disks for distribution.

This method and system allows a computer system user to restore the multiple files of a container from the burned CD-ROM disks without losing any of the information contained in the original attributes of the native system container files, which had been converted into standard CD-ROM formatting.

Thus, a now flexibility for the distribution of software has been provided, whereby CD-ROMs which were burned with text stream data files involving both Unisys A Series data files, and also NT program and data files, can now be utilized in order to read-out, decode or "unwrap" the A Series container files in a fashion which restores their native information and attributes for use by any Unisys A Series user system, while at the same time providing data to the NT system.

SUMMARY OF THE INVENTION

When original specialized and formatted native proprietary files have been converted to byte stream industry standard data files on a compact disk for utilization by multiple platforms, it is often necessary to recapture the original files as multiple files in a container for use by the proprietary system which has often been integrated with another system, and which may involve a Microsoft NT, a UNIX or other platform in a network integrated with an A Series system.

The present method and network allows a typical integrated system network, such as a Unisys A Series and Microsoft NT system, to utilize the byte stream data multiple files of a container from a compact disk and programmatically transform the byte stream multiple data container files into their originally specified format and native attributes, usable by the A Series platform.

A work flow language, placed in the CPU Control Program of a Unisys A Series system (first platform), utilizes an Unwrap command allowing an A Series Master Control Program to execute a MCP_FILEWRAPPER program which executes another program MCP_WAAPPER which then reconstitutes the original native files of the container for use by the original proprietary system and its specialized and formatted native files.

Additionally, a second platform (NT or UNIX) can be integrated with the first platform in a fashion whereby a Container of multiple byte stream text files can be transferred from the NT or UNIX platform to the A-Series platform where they can be unwrapped into native A-Series files for utilization by the first platform (Unisys A-Series).

BRIEF DESCRIPTION OF THE DRAWINGS

FIGS. 2A and 2B show a flow chart indicating the algorithmic sequence of steps used to unwrap a text stream data file of a container for transformation into a usable native container file, usable for a proprietary system such as to Unisys A Series computer system;

FIG. 3 is an illustration of the format for a WRAPPEDATA file as byte-stream file;

FIG. 4 is an illustration of the format for a container file as a byte stream file;

GLOSSARY ITEMS

Figure 1A:
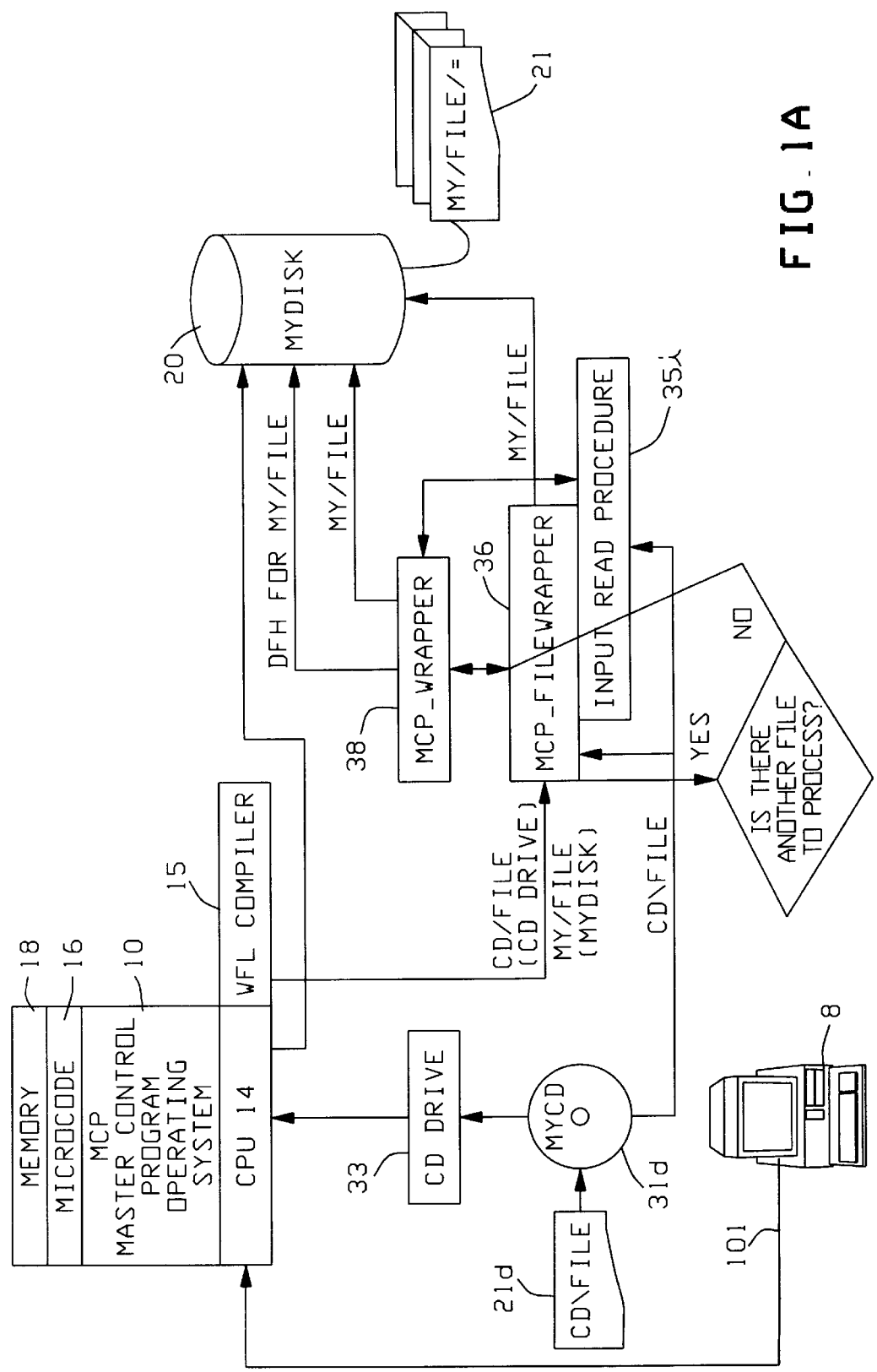
FIG. 1A is an illustration of a system holding a text stream data multiple file container on a CD-ROM which can be converted into original native files in a container by transforming them and placing them on the Disk 20.

1. A SERIES ATTRIBUTES: Native attributes that can be assigned to a file to allow the system to control how the file is accessed and used, and by whom (security privileges). There are somewhere on the order of 450 such attributes for Unisys A Series files.
2. A SERIES KEYS FILE: A native file, located on a individual system, that contains license key information used to control which features an individual system is allowed to use for some features. License keys need to be purchased by the user before the feature can be utilized on the individual system.

3. ATTRIBUTE INFORMATION OF A SERIES FILES: specific attributes assigned to individual files stored in the file's Disk File Header (DFH) on Disk which is located in the individual disk's file system directory.

3a. DISK FILE HEADER: An array containing all of the information necessary to open and access a file on disk, including the Disk Row Address information for all of the areas of a file that in located on the disk 4. BYTE-STREAM FILE: A character oriented file with FILESTRUCTURE=STREAN, MAXRECSIZE=1, AND FRAMESIZE=8. This is a simple, non-executable, data file than can exist on any kind of system.

5. DATA CD-ROM: See ISO 9660 Format (Item 12 below). These CD'S appear like disks on A Series systems. multiple user access is allowed to these CDs.

6. DIGITAL SIGNATURE: A digital signature is a hash pattern created by applying an industry standard signaturing algorithm (similar to a checksum) to a file or data stream, along with a private key. This hash pattern travels with the file across a network and is used, along with a public key, in order to ensure the file has not been compromised (intentionally or otherwise) during the transfer process.

7. CONTAINER: A singlone or moream file consisting of one or more wrapped files; a simple directory of files stored in the container, including optionally a digital signature.

8. CREATIONDATE: An A Series (Unisys) file attribute, used to store the date and time a file was created.

9. FILEDATA—LFILE: An A Series (Unisys) program, or utility, used to interrogate attribute information of native A Series files.

10. FILEKIND: An A Series (Unisys) file attribute, used to identify the internal structure of the file being accessed (e.g. Algol symbol, Algol object code, character data, or system directory).

11. INTERIM CORRECTION PROCESS (ICP): The process used by Unisys computer systems to deliver software updates to released products held by customers.

12. ISO 9660 FORMAT (A.K.A. ISO STANDARD FORMAT, HIGH SIERRA FORMAT): A standard format used for directories and files on CD-ROM disks. The presentation for the information contained on these directories is at the operating system's discretion. On Unisys A Series systems, directories and files are viewed using the standard Cande "FILES" and ODT "PD" commands.

12a. CANDE: Command and Edit which involves Unisys A Series primary interactive environment software.

12b. ODT: Operator Display Terminal (also called System Console). It is a main operations station or console used for controlling Unisys A Series system activity.

12c. PD: Print Directory. The Unisys A Series system command used to list all of the files located on a disk, as stored in the disk's directory.

13. LIBRARY MAINTENANCE FORMAT: A Unisys proprietary format for tapes containing multiple files used primarily for archives, backup and restore, or transferring of files among A Series systems.

14. LIBMAINT CD-ROM: A specially formatted CD-ROM, created on an ISO 9660 Formatted CD-ROM, that contains an image of a Library Maintenance tape. This appears to an A Series system as if it were a Library Maintenance tape. Only one user is permitted access at a time, and only COPY (and COPY-related) syntax, and Filedata TDIR are allowed to act on this CD.

14a. TDIR: Tape Directory Command issued to the FileData program to obtain directory listing of files stored on a Library Maintenance Tape or Compact Disk.

15. NATIVE A SERIES FILES: A file created on Unisys A Series systems or ClearPath HMP/NX systems specifically for use on that same class of system.

16. NON A SERIES FILES: Files that were created on systems other than Unisys A Series or ClearPath HP/NX systems.

17. NEW FORMAT FILE: the Byte-Stream data file that results from executing the WRAP process on an A Series file.

18. NT SOFTWARE—CD BURN PROCESS: Any standard "Off-the-shelf" package capable of burning imagers on to a Compact Disk (CD) that runs on a Microsoft NT system.

19. P, O, G, keys: Primary numbers, stored in the system's digital signature keys file and used in the creation of public/private keys as well as both signing files and verifying the signatures of files, using the public and private keys.

20. PUBLIC & PRIVATE KEYS: Public and private key pairs are generated at the same time by a special utility. These key pairs are used to create a signature and then later check that signature to ensure that a file has not been compromised. These keys are generated together and must be used together to ensure the integrity of a file. Under normal operations, the private key is intended to be known only by the person or utility generating the hashed signature of the file. This key is meant to be restricted. The public key can be made available to any person or utility wishing to check the signature to ensure the integrity of the file once it has reached its destination.

21. PUBLIC/PRIVATE ENCRYPTION: A common methodology for encrypting files so they may be transported across an open network so as to use a public/private password encryption scheme. Typically, the two passwords are programmatically generated at the same time such that they can be used in conjunction with each other. One password, the private one, will be used to encrypt the file. The other password, the public one, is used by the recipient of the file to decode it. Typically, a smear pattern, or some clear text string, is added at the beginning of the file before the file is encrypted. When the file has been decoded using the public password, this smear pattern should match what was originally placed in the file. If the string does not match, it can be assumed that the integrity of the file has been compromised.

22. RELEASEID: A Unisys A Series file attribute, used to store the specific release level that the software was created for.

23. SHARE: A Directory or disk that is made available to selected users or all users across a network.

24. UNWAP: The process of taking a previously wrapped file (or data stream) and coupling it with the information from its original Disk File Header that was stored in the Wrapped file, to re-create the original native A Series file as it existed prior to being wrapped.

25. WFL SYNTAX: Work flow language syntax, used to control job flow on a system.

26. WFL UNWRAP syntax: Specific work flow language syntax used to execute the unwrap process on a file, or file.

27. WRAP: The process of packaging an A Series file, along with its Disk File Header information (and optionally a digital signature) as a data stream, or as a byte-stream data file (FILESTRUCTURE=STREAPP, MAXRECSIZE=1, FRAMESIZE-8), so that it can be transported across heterogeneous networks and non-A Series specific media, while still maintaining the information of its native A Series attributes.

28. INPUT FILE (WRAP): The already existing file that is to be packaged into a byte-stream text file by the wrap process.
29. OUTPUT FILE (WRAP): The resultant byte-stream text file created by "wrapping" the input file.
30. INPUT FILE (UNWRAP): The already existing file that has previously been packaged into a byte-stream text file by the Wrap process. This file is to be restored back into a native A-Series (Unisys) file by the Unwrap process.
31. OUTPUT FILE (UNW): The native A-Series file as restored by the Unwrap file.

DESCRIPTION OF THE PREFERRED EMBODIMENT

In regard to the unwrapping of multiple files of a container (holding byte stream text files) from a CD for use of a system such as the Unisys A Series computer system, FIG. 1A shows how a CD-ROM 31d holding a file 21d (CD\FILE) can be used in order to convert the text stream data files into the original native files with all their attributes and place them on the Disk 20 (MYDISK) so that now these files are readily useable by the CPU 14 and the Master Control Program 10 of the Unisys A Series computer.

Subsequently, hereinafter FIG. 1B will illustrate where the compact disk 31d is connected to a Microsoft NT system 30 which is integrated with a Unisys A Series platform. This could also be a UNIX system in what is known as a Unisys ClearPath HKP (Heterogeneous Multi Processor) environment.

Now first focusing on the system of FIG. 1A, there is indicated a user-operator terminal 8 connected on channel mark 101 to a typical Unisys A Series system having a central processing unit 14, a Master Control Program (MCP) 10, a microcode memory 16, and a main memory 18.

The compact disk 31d holds a file 21d, designated CD\FILE, which is connected to a CD drive unit 33, which is in communication with the CPU 14. A workflow language compiler 15 (WFL) works in coordination with the CPU 14 and the Master Control Program 10, (MCP).

Within the Master Control Program 10, there are new software programs which are designated as the MCP__FILEWRAPPER program 36 and also the MCP__WRAPPER 38, which function in this situation for the decoding of text stream data files residing on the compact disk (CD) 31d, FIG. 1A. The MCP__FILEWRAPPER program 36 has a subset of programs called the Input Read Procedure 35i, and also a program designated Copy__From__CD Program 36x.

As seen in FIG. 1A, the WFL compiler 15 conveys the commands to unwrap the CD\FILE 21d over to the MCP__FILEWRAPPER program 36, which program 36 will then cooperate with the MCP__WRAPPER program 38, in order to convey the unwrapped data of the Disk File Header (DFH) for MY/FILE and also for the file MY/FILE 21 itself over to the disk 20 (MYDISK).

The compact disk 31d conveys the information CD/FILE over to the program 36 MCP__FILEWRAPPER, and also to the Input Read Procedure Program 35i, which then conveys the information for MY/FILE (and also the "new" DFH for MY/FILE) over to the disk 20 to provide the file 21, designated MY/FILE/=. Thus now, the disk 20 can now provide the proper "unwrapped" A Series protocol and attributes which are useable by the A Series computer.

As seen in FIG. 1A, the user operator 8 proceeds on channel 101 to execute the Work Flow Language 15 from the terminal 8 through the operating system 10. The WFL calls the operating system procedure 10 in order to get the program MCP__FILEWRAPPER 36, which has the input procedure 35i embedded within it.

MCP__FILEWRAPPER program 36 calls the subsequent program MCP__WRAPPER 38. The program MCP__WRAPPER then calls the input procedure 35i of the MCP__FILE__WRAPPER 36, which has an input procedure 35i, which reads the data from the CD\FILE 21d on the compact disk 31d and passes it back to the MCP__WRAPPER 38.

The MCP__WRAPPER 38 receives data from the input procedure 35i, processes the data, recreates the disk file header DFH for MY/FILE/=,21, from the data, then writes the data out in the native A Series format as MY/FILE/=,21, which resides on MYDISK 20. Then it (38) writes out the Disk File Header (DFH) for MY/FILE/=,21, onto the Disk 20, designated MYDISK.

Figure 1B:
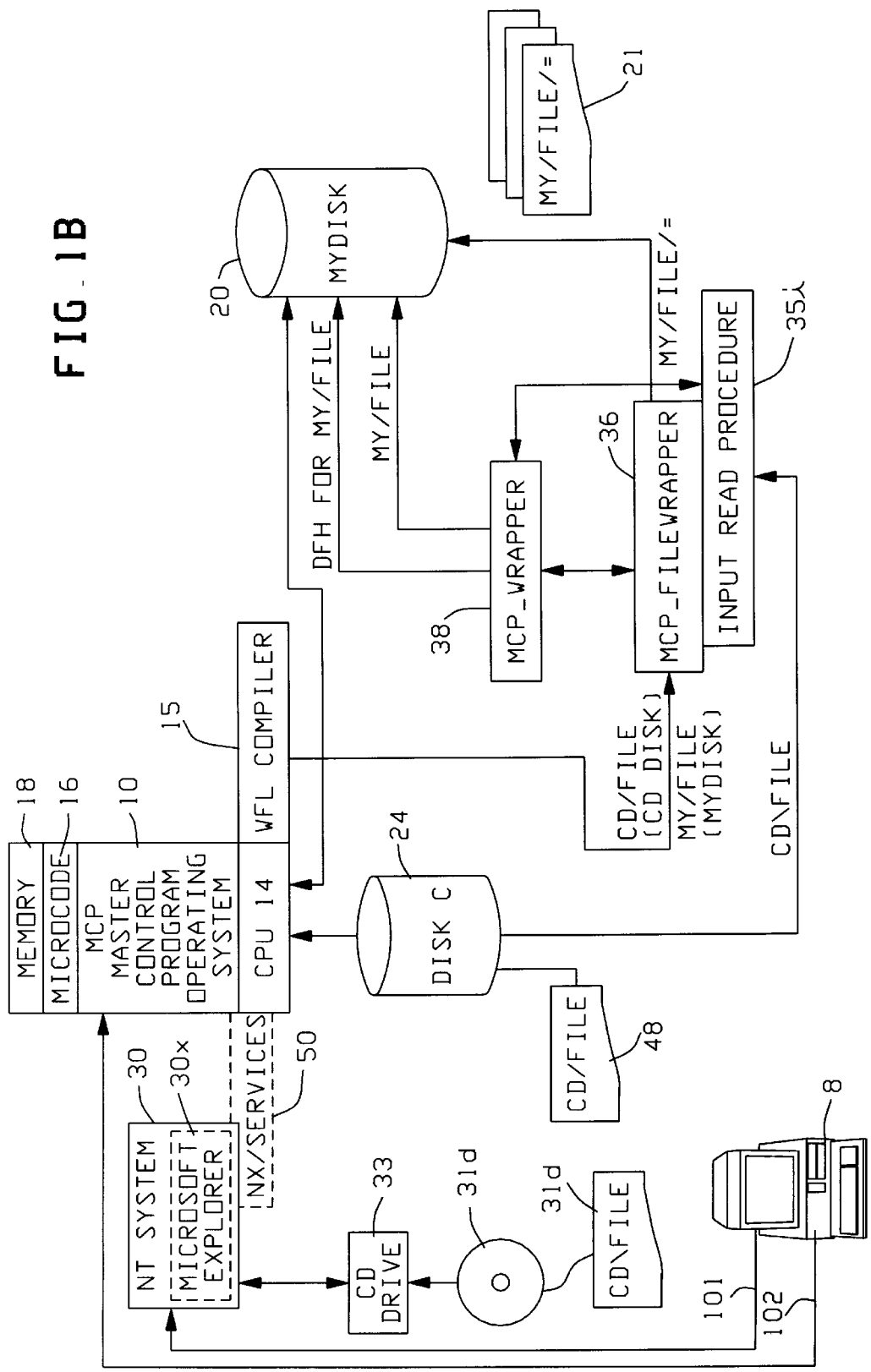
FIG. 1B is an illustration for the unwrapping of text stream data file a container through use of a Microsoft system in a ClearPath HMP NX environment.

FIG. 1B is an illustration of an "integrated" system of an A Series platform in use with a NT Microsoft system (or a UNIX system) as it exists in a Unisys ClearPath HMP/NX environment whereby a byte stream text of container data files reside on a compact Disk 31d as a container 21d designated CD\FILE. This sequence is illustrated in the flow chart of FIGS. 4A and 4B.

In this situation, as seen via channel 101 of FIG. 1B, the user operator 8 executes the Microsoft Explorer program 30x on the NT system 30. The operator uses the "drag and drop" facility in order to transfer the CD/FILE, 21d, via the CD Drive 33 on to the Disk C,24, which is owned by the A Series MCP (Master Control Program) system 10 but is likewise made available for use by the NT system 30 as a "share" by means of the NX/services utility 50.

Then the user/operator at terminal 8 goes to channel 102 by executing a WFL (work flow language) command to the Master Control Program 10.

Thus in FIG. 1B, the channel 102 functions to call the operating system of the MCP 10 to access the MCP__FILEWRAPPER program 36 which has the input procedure 35i embedded within it.

The MCP__FILEWRAPPER 36 then calls the MCP__WRAPPER program 38. The program 38 then calls the input procedure 35i of the MCP__FILEWRAPPER input procedure 35i which reads the data from the CD\FILE 48 residing on the Disk 24 and passes this data back to the MCP__WRAPPER 38.

The MCP__WRAPPER 38 receives data from the input procedure 35i, processes the data, and re-creates the Disk File Header for MY/FILE,=,21, from the data, then writes the data out in native format as MY/FILE/=,21, (onto MYDISK 20) then it writes out the Disk File Header (DFH) for MYFILE/=,21, on to KEYDISK 20.

Thus, in respect to FIG. 1B, the user/operator on terminal 8 communicates with the NT system 30, the Microsoft Explorer program 30x, and the byte stream text data files of the container on Disk 34d (CD\FILE 21d). This data is passed on through the CD Drive 33 on to the Microsoft Explorer, 30x.

The A Series computer system uses the CPU 14, the Master Control Program 10, the Microcode Memory 16 and the local memory 18 in order to communicate to the Disk C,24, and deposit thereon the CD/FILE 48. The Disk C,24, passes the CD/FILE 48 over to the program 36 (MCP__FILEWRAPPER) to utilize the input read procedure 35i and also to utilize the MCP__WRAPPER program 38, and send this as MY/FILE over to the Disk 20 where it resides as MY/FILE/=,21.

At this time, the original byte stream text files have now been converted to native A Series files with their various attributes and can now be used directly by the A Series computer 14.

Additionally, in FIG. 1B, the work flow language (WFL) compiler 15 will transfer, from Disk C,24, the CD/FILE 48 over to the program 36. Then program 36 (MCP_FILEWRAPPER) will access the program 38 (MCP_WRAPPER) whereby the Disk File Header for MY/FILE is passed on to the Disk 20 and likewise the data of MY/FILE/=,21, is also passed to Disk 20.

Figure 2A:
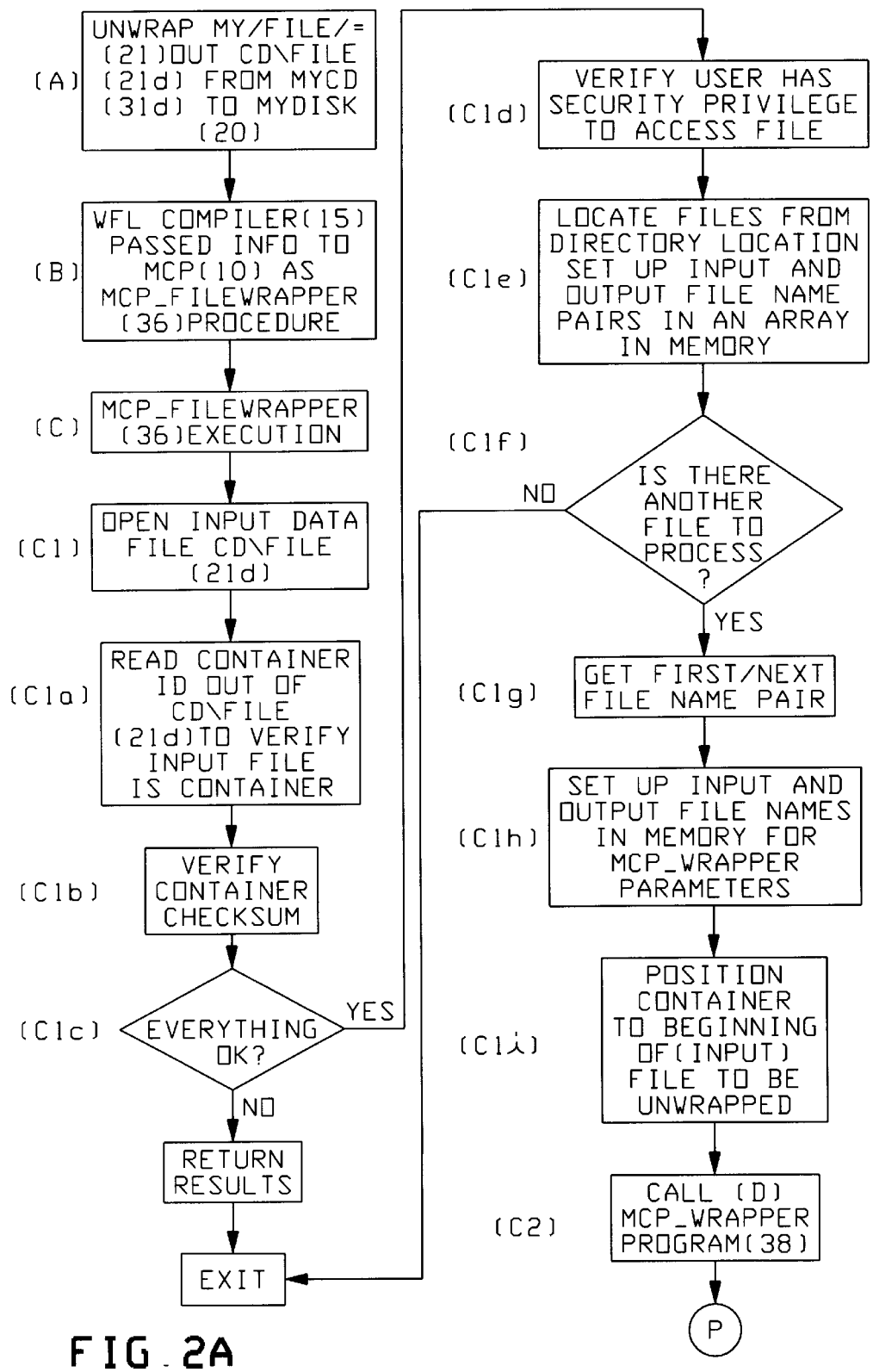

MACRO-SEQUENCE: FIGS. 2A and 2B show a high level series of the sequential steps required in taking a compact disk container file CD\FILE 21d, residing on the compact disk 31d, (FIG. 1A) which is in an industry-standard byte stream text format, and eventually converting it to native A-Series files on the disk 20 (MYDISK), where it resides as MY/FILE/=,21.

In FIG. 2A, at step A, the client-user 8 enters the Work Flow Language command to "Unwrap" the CD\FILE 21D. As seen in step A, the command involves—UNWRAP MY/FILE/=(21) out of CD\FILE (21d) from MYCD (31d) to MYDISK (20).

Then at step B, the Work Flow Language (WFL) compiler 15 passes this information to the Master Control Program 10 (of FIGS. 1A, 1B), in order to institute the program procedure 36 designated MCP_FILEWRAPPER.

Then at step C, the MCP_FILEWRAPPER program 36 is executed through a series of substeps designated C1 through C4.

At step C1, the program will open the input data file designated CD\FILE (21d).

It will be seen that step C1 has a sequence of subsidiary steps designated (C1a through C1i), which then sequences into step C2 (of FIG. 2A).

Now referring to the substeps of C1, it will be seen that step C1a involves reading the Container identification (ID) out of the CD\FILE (21d) on the CD-ROM (31d) in order to verify that the input file is a "Container".

At step (C1b) the program then verifies the Container's checksum, to obviate any error conditions. This step serves as an additional verification that the input file is a Container.

At step (C1b) the program then verifies the Container's checksum, to obviate any error conditions. This step serves as an additional verification that the input file is a Container.

This sequence then continues onto step C1c where a decision tree verifies the checksum as being okay (YES) and proceeds outward on the "YES" leg to step C1d. However, if the checksum at step C1c was not verified as proper, then the "NO" leg operates to return an error to the CPU 14 to exit this sequence at this time.

At step C1d, the CPU 14 verifies that the User has the proper security privilege in order to access a file.

At step C1e, the CPU 14 will set up an input file, an output file, name pairs into an array of the Main Memory 18.

At step C1f, a decision tree is operated on to check whether there is another file to process or not. If there is not another file (No), then the sequence will exit. However, if there is another file to process (YES) the sequence operates onto step C1g.

At step C1g, the CPU 14 will get the first or next file name pair.

Then at step C1h, the CPU 14 will set up the Input and Output file names in Main Memory as parameters for the MCP_WRAPPER program.

At step C1i, the CPU 14 will position the container to the beginning of the Input file to be Unwrapped.

After positioning the Container to acquire the beginning of the Input file to be Unwrapped, the sequence will now move into step C2.

Here at step C2, a call will be made to step D which invokes the MCP_WRAPPER program 38, which will then continue as indicated at step D of FIG. 2B.

Now referring to FIG. 2B, since the previous step C2 called the program step "D" which involved the $MCP_{13}$ WRAPPER program 38, then at step D, the program sequence will execute the MCP_WRAPPER program 38 utilizing steps D1–D18 as described in the section of this document entitled "Algorithmic Sequence for Unwrapping a Byte Stream Text Data File from Compact Disk".

Now, step D will execute the Input Read procedure (35i) by utilizing the MCP_WRAPPER program 38. As noted in FIG. 2B, this constitutes a recreation of the original native file of the A-Series computer system.

At step C3, the system will display the results of the MCP_WRAPPER program (38) by making a call C3(i) to the User (8). Then; at C3(ii) the error results will be saved in Main Memory 18. At C3(iii) a decision block queries if there is a Fatal Error. If "NO", then the sequence returns to step C1f. If "YES", then the CD\FILE 21d is closed at C4 after which the results are returned, at step E, to the caller.

As a result of this sequence, the Unisys A-Series system operating with its CPU 14, has been able to transform each byte stream data file 21d of the container into a natively formatted file 21 shown in FIG. 1A as MY/FILE/=.

Likewise, as seen in FIG. 1B, the system would take the compact disk file 21d (CD\FILE) of FIG. 1B, from the disk 31d and utilize the CD drive 33 in conjunction with the NT System 30 in order to provide a newly formatted native file 21, on the disk 20, for utilization by the A Series system CPU 14.

In the situation of FIG. 1B as previously discussed, the user-operator 8 executes the Microsoft Explorer program 30x on the NT System 30, where the CD\FILE 21d from the CD drive 33, is placed onto the disk C,24, which disk is owned by the A Series Master Control Program System 10, but is likewise made available as a share to the NT System 30 through the NX services utility 50.

Subsequently, the user-operator at terminal 8 uses the channel 102 to execute the WFL command, which calls the operating system to access the MCP_FILEWRAPPER program 36 which has the input procedure 35i embedded within it.

The MCP_FILEWRAPPER 36 calls the MCP_WRAPPER program 38, which calls the input procedure 35i, which then Reads the data from the CD/FILE 48 on disk 24, and passes this data back to the MCP_WRAPPER 38.

The MCP_WRAPPER program 38 receives the data from the input procedure 35i, processes the data, and recreates the disk file header for MY/FILE/=21 from the data, and Writes the data in native format on the disk 20 as the native formatted file 21, after which it writes out the Disk File Header (DFH) for MY/FILE 21 on to the disk 20.

Thus, in this case, an integrated system which is designated by Unisys as a ClearPath NX system, whereby a Unisys A Series system and a Microsoft NT system are inter-operable between each other, this also permits the use of the NT system to use the specialized program interfaces in order to convert text stream data files into native files for use by the A Series system.

Another operational system problem aspect involved is when an operator wishes to take a file from a first system, such as an A Series system program and copy it into a UNIX box or an NT box under a situation such that the information format cannot normally be transported because of the format and protocol differences.

Thus, the specialized structure and format of the A Series native files which normally could not be moved across a network, would have to be reconstituted and stored as part of the data in the data file and then made into a regular character data file of a common format such that any operating system can read it. This would involve a byte-stream data file which could be read by any platform, whether it be a UNIX box, an IBM box, or a NT box.

In what is called the "Unwrapping" operation, as described and utilized in the present invention, all the time-stamped dates are reapplied, all the disk and row information is supplied, the file is rewritten row for row, segment for segment, exactly as it looked in the native format on the original system. Thus, if there were "spaces" at the end of the segment on the original file, there will also be the same spaces at the end of this segment on the resultant file. This is so because all this information is in the file's Disk File Header.

Thus, what has been accomplished is to take a first original native file and repackage it, by burning the file into a CD-ROM, so it can be transported anywhere to a second location, with different platforms and then can be sent back to a first platform to be reconstituted and loaded to act like the native first platform's original file.

One method of getting system software out from the originator to a customer is on a Compact Disk, that is a CD-ROM, which has specially formatted arrangements in order to transmit A Series software. However, these native files often are not always in an industry standard format.

Customers often ask saying that they have a Compact Disk writer on their PC and they want to know—"how do I format a file so that I can distribute software to my other terminals" or to other customers that they have in their area?

Thus, the present system allows these recipients to download these files to their personal computer and then burn them into a Compact Disk and send them to their local co-workers or to their other customers. The burned-in files on the Compact Disk are burned using Industry Standard format for compatibility to other systems platforms, such as NT system platforms, UNIX system platforms, IBM system platforms, DEC System platforms and when reconstituted, to Unisys A Series system platforms.

Thus, the presently described system operates such that operators using the Unisys A-Series systems (or a Unisys ClearPath NX system which includes a second platform such as an NT platform) can "unwrap" their files directly from an industry compatible Compact Disk, so that the file is usable just by putting the Compact Disk into the A Series (or NT) system and giving it the command to "Unwrap Files". The files and software can then be received for utilization.

The system of co-pending application U.S. Ser. No. 08/962,468 requires the packaging of native files of a first computer system such as a Unisys A Series system, in such a way as to allow them to co-exist on the same CD-ROM media, as non-native (A-Series computer system) files. This packaging of files also allows for the transport of the native (A Series) files across heterogeneous networks, while still maintaining all the information on their native (A Series) attributes.

Previously CD-ROM's contained native A Series software on CD disks which were burned from a library maintenance formatted tape. However, this limited these types of files to only be useful for native A Series systems which are formatted for native A Series files. The present system utilizes the CD-ROM disks which now will be compatible with suitable files of other computer platforms, such as a Microsoft NT system, UNIX systems, etc. in addition to the Unisys A Series.

The native formatting of A Series files had attributes such as FILEKIND, CREATIONDATE, and RELEASEID, which needed to be placed in a format capable of being stored on a disk media using an industry-standard file format, thus to provide compatibility with non-A Series platforms.

As mentioned earlier, "Wrapping" is a term used to define the process of packaging a native A Series file (first computer system) along with its Disk File Header information, (plus a checksum, and optionally a digital signature), as a byte-stream data file (FILESTRUCTURE-STREAN, MAXRECSIZE=1, FRAMESIZE=8) so that it can be transported across heterogeneous networks and non-A Series specific media, while still maintaining its native A Series attributes.

The "digital signature" is created using an industry-standard public key/private key signaturing algorithm which provides a measure of security in that it allows a user confidence as to where the file originated from. The present system encompasses the Master Control Program (MCP), the Work Flow Language (WFL) program, and the FILE-DATA work necessary to wrap files by packaging them into new, byte-stream files (Wrapping) and later restoring them to their original native A Series format when needed for A Series systems (Unwrapping).

NEW WFL SYNTAX: This involves a new work flow language syntax, so that arrangements are made in the WFL compiler 15 to support the new syntax which will have some smilarity to a previous used Library Maintenance MOVE command. The new syntax allows a User to wrap either a single file, a list of files, or a directory of files, in addition to subsequently enabling the unwrapping of these files, by specifying both the input file and the output file, or the directory title and location.

ADDED PROGRAMUATIC INTERFACES: A programmatic interface is provided during "wrapping", that will allow the User-Caller to pass a native A Series file's title and location as "input" along with an "output" file, title and location. The "output" file will be a "byte-stream" file with a beginning data block containing (i) an identification stream; (ii) the original files Disk File Header information; (iii) the file itself as byte-stream data; and (iv) an ending block containing a checksum. This is illustrated in FIG. 3.

Thus, the added programmatic interface allows the caller to pass the byte-stream file's title and location as input, along with an output file title and location if needed, for subsequent use by the "unwrapping" process. The "resultant file" will be a native A Series file created with the output file title and location, but also containing the data and all of the native A Series attributes of the original file.

SINGLE PROCEDURE CALL VIA FIRST PROGRAMMATIC INTERFACE 36: This first programmatic interface (NCP_FILEWRAPPER 36) will allow input and output directory names to be passed in order to wrap or unwrap a directory of files with a single procedural call. This also allows for a single output "container file" to be created from multiple input files.

SECOND PROGRAMMATIC INTERFACE: This second interface (MCP_WRAPPER 38) is created to allow a caller to pass the A Series file's title and location as "input", together with an "output" procedure. The data returned (FIG. 3) to the caller's output procedure will be a stream of data with (i) a beginning data block containing an identification string; (ii) an options area; (iii) the original file's Disk File Header and Header checksum information; (iv) the file itself as byte-stream data; and (v) an ending block containing a checksum.

FIRST PROGRAM INTERFACE: Functionally, the first programmatic interface 36 will also allow the caller to pass an input read procedure, along with the title and location of an output file. The data passed to the input procedure here would consist of a stream of data, with a beginning data block containing the identification string, the original file's Disk File Header (DFH) information, the file itself as "byte-stream data", and also an ending block containing the checksum, which is basically the same information that was passed to the output procedure when the file was originally wrapped. Here, the "resultant file" will be a native A Series file created with the output file title and location, but containing the data and all of the native A Series attributes of the original file.

NEW FILEDATA SYNTAX: New syntax has been added to the FILEDATA LFILEs command in order to specify that the file being interrogated is a WRAPPEDDATA file. If this is a WRAPPEDDATA file, then FILEDATA will report the "attributes" of the native A Series file contained within the wrapped data file, rather than the attributes of the "wrapped" data file itself.

WFL WRAP COMMAND: This is the work flow language wrap command usable in a first system computer such as the Unisys A Series computer system which can be executed to initiate the action of taking specialized formatted native A Series files and turning them into byte-stream files which can later be burned onto CD-ROM disks. Thus, the software files of a first computer platform, such as the Unisys A Series system, can now be made able to co-exist compatibly on the same CD-ROM's as other types of files and software which are "not-A Series" software.

KEYSFILES: The system will provide the use of an A Series KEYSFILE which will also be wrapped using the new WFL syntax. This resulting file will also be burned onto the CD-ROM. Normally, the Unisys A Series KEYSFILES are shipped on separate tapes from the rest of the software releases, so that in the present situation, the newly wrapped KEYSFILE will be shipped on a separate data CD-ROM separate from the rest of the A Series release software files.

The A Series KEYSFILE is a file on each A Series system used to store License Key information for the individual system in order to determine which of the Unisys licensed features the user has purchased for use on that system.

The new WFL UNWRAP syntax can be used to unwrap the KEYSFILE off of the CD, while copying it into the A Series system. Once the file (as KEYSFILE) has been copied onto the A Series system, then a cK MERGE can be performed. IK MERGE is the system command used to merge the data from the now KEYSFILE (unwrapped from the CD ROM on to Disk) on the A Series system into the system's current KEYSFILE.

CHECKSUM: A checksum is calculated for the Disk File Header (DFH) for every file as it is wrapped. This ensures that there is no unintentional corruption of the Disk File Header as the file is shipped across a network it also provides the receiver of the file some measure of confidence as to the origin of the file.

In addition to the checksum for the Disk File Header, a checksum is also calculated for the "entire context" of the file including the Disk File Header (DFH).

SIGNATURE AND CHECKSUM (PREVENTION OF CORRUPTION): The checksum will not normally be sufficient to ensure that a Disk File Header has not been intentionally corrupted, since the checksum algorithm is not protected and is fairly easy to reproduce. There is significant overhead to validate the Disk File Header if there were no protection of the structure, other than the simple checksum. Thus, without any real protection for the Disk File Header, it would be necessary to create an entirely new Disk File Header for the original file, and then separately validate every attribute of the header before it could be considered trustworthy for application.

The Master Control Program (MCP) 10, FIG. 1B, will assume that a Disk File Header is a valid piece of data. However, it is necessary to validate the Disk File Header before the rest of the file has even been retrieved, since even the information regarding the "size" of the file is stored in the Disk File Header. In order to insure that there was no intentional corruption while the file was in transit and also provide the "receiver" of the file with some insurance that the sender of the file was indeed that who the receiver expected it to be, a digital signature may be requested when the file is "wrapped" by specifying a private key with which to identify the signature file while wrapping. The receiver "must" specify the file's public key in order to verify the file when "unwrapping" it.

PUBLIC/PRIVATE KEYS FOR SIGNATURING: A KEYS generation utility is provided as a separate utility to generate public/private key pairs to be used when signing files. Public/Private key pairs are generated using the new utility in order to be used by the wrapping interfaces for signaturing files.

WRAPPEDDATA FILE FORMAT: With reference to FIG. 3, there will be seen the format of the WRAPPEDDATA FILE which will be a simple byte-stream file. This file, as seen in FIG. 3, will contain several sections. The first section (i) is the word UNISYS "000010" which will be "EBCDIC" data used to indicate that this is likely to be a Wrapped file. The number associated with this identifier may be changed if the format of this file is changed.

The second block (ii) labeled "options" contains the options used when wrapping the file, such as the identifier to be used to locate the "pulic key" information in order to verify a file containing a digital signature.

The third block of FIG. 3 is (iii) designated as the Disk File Header, which involves a copy of the actual A Series Disk File Header for the file (with the exception of the actual physical disk row addresses stored in the Header). This will become the actual Disk File Header for the file when it is restored to its native format after an "unwrap" operation. Additionally in block (iii), there is seen the Header checksum, which is a separate checksum for the Disk File Header itself.

The fourth block (iv) of FIG. 3 indicates "the file" which involves the contents of the file itself, written as byte-stream data.

The fifth block (v) of FIG. 3, is designated as "checksou" and optional "digital signature", which will be either the checksum and optionally the signature calculated for the file and the Disk File Header combined, using a private key from a public/private key pair. The "options" signal will indicate whether this particular wrapped data file contains a signature, or it is a checksum.

DSAKEYSFILE FILE FORMAT: The new system involves a keys file called "SYSTEM/DSAKEYSFILE". This file is stored and managed similarly to the manner of existence on earlier A Series systems which used the "SYSTEM/

KEYSFILE". This file is used to store records of ID, software level, public key, PQG. These involve the following:

(i) ID: This is a unique and meaningful EBCDIC string with a length of up to 17 characters which is used for external display and for identifying the set.

(ii) Software Level: This is a real number that identifies the software level involved.

(iii) Public Key: This is a DSA key generated along with a private key based on certain prime numbers designated P, Q, G. This key is subsequently used in the "Unwrap" process of the A Series software. The Public Key can be specified as part of the WFL Unwrap Command, or it may be picked up automatically from the DSAKEYSFILE if the "options" signal indicates the file contains a digital signature.

(iv) P.O.G: These are prime numbers generated by a special utility. For a given set of (P,Q,G), there are a variety of public and private key pairs which can be generated.

INTERFACE OPERATIONS: This system involves new work flow language (WFL commands) designated as WRAP and UNWRAP which are provided to allow Users a simple method of invoking the new interfaces of this system.

There are two new FILEKIND values created to identify the files of the new format. These will help to prevent users from accidentally using the WRAP syntax to act on a file that has already previously been wrapped.

There is basically now provided two new programmatic interfaces designated as (i) MCP_FILEWRAPPER (36, FIGS. 1A, 1B) and also (ii) MCP_WRAPPER (38, FIGS. 1A, 1B). These programmatic interfaces are exported out of the Master Control Program (MCP) 10.

FILEKIND: This involves a set of values which will aid in identifying files that have been wrapped as long as the files have never left the environment of the first computer system, that is to say, the A Series computer. Once the file has then been copied into a non-A Series system, and then back on to the A Series system, this information is lost. The main purpose of new FILEKIND value is to ensure that a user does not accidentally attempt to WRAP an already WRAPPED file, as would be the case if a WFL WRAP command was executed on a directory of files and then the system did a Halt/Load before all of the files of a directory were wrapped. If the Job were to restart after the Halt/Load, the WRAP command would begin to act on the directory over from the very beginning. If a file is encountered with a FILEKIND value of WRAPPEDDATA, that file will be skipped, and an error message will be issued for the file indicating that the file had already been previously wrapped.

WORK FLOW LANGUAGE (WFL): The work flow language syntax is provided to allow a user easy access to the new programmatic interfaces. The new WFL commands permit the user to access the new interfaces to institute a Wrap or an Unwrap action without having to know the layout of the interfaces or having to create a program to call up these interfaces.

TASKSTRING: This is a data structure that is used to contain private or public key information for either signaturing or for verifying the signature of the file. Thus, for an "UNWRAP" operation, the TASK STRING will be used to specify the public key that should be used to verify the signature that was calculated when the file was wrapped. Then conversely, for the WRAP operation, the TASK STRING is used to specify the "private key" that should be used to calculate the signature of the file.

MCP FILEWRAPPER INTERFACE: The newly developed MCP_FILEWRAPPER program (36, FIGS. 1A, 1B) is used for work flow language support and User programs. A User can call this program specifying either a "wrap" or an "Unwrap" action along with the title and the location of both the input files and the output files. Of course, the input file specified for a "Wrap" operation must not have a FILEKIND of WRAPPEDDATA. Further, the caller must have the proper privilege for both the input and the output files or directories.

The MCP_FILEWRAPPER program involves procedures which return errors. These errors are returned as display messages if the procedure is called from the Work Flow Language (WFL).

MCP WRAPPER INTERFACE: When this interface program is called to "Wrap" a file, it takes a standard form name for an existing A Series file, along with an output, or Write, procedure. The A Series file's Disk File Header (DFH) will be a checksum passed to the output procedure as data along with the checksum for the Disk File Header. Then the file itself will be read and passed on to the output procedure as data. Finally, there will be provided a checksum and optionally a calculated digital signature or a checksum for the entire file which will be passed to the output procedure as data.

When the MCP_WRAPPER program 38 copies a file from disk (i.e. "Wraps" the file), it updates the files' COPYSOURCEDATE time-stamp in the Disk File Header (DFH) of the A Series file that has been wrapped.

One of the parameters for the MCP_WRAPPER is the procedure designated IOWRAP. IOWRAP is the procedure being passed, either as an output or a WRITE procedure for "Wrap", or an input or READ procedure for the "Unwrap". The parameters for IOWRAP involve (i) LGTH which indicates the length array data in bytes; (ii) DATA is the array containing the data to WRITE (for wrapping) or READ (for unwrapping).

It is significant to note that a Disk File header (DFH) can involve data up to about 20,000 words long. Thus, the IOWRAP parameter procedure must be able to handle at least 20,000 words in the data array in one call.

DSAKEYSFILE: The wrapping routine upon recognizing that a digital signature is required, obtains the P, Q, G, values from the active DSAKEYSFILE. It then provides these values, along with the User-furnished private key, to the DSA "signing" routine. This routine, after signaturing the file, returns two large integers designated R and S. These two integers can be stored within the file as the digital signature by the wrapping process.

When this file is Unwrapped, the unwrapping routine gets the P, Q, G values from the active DSAKEYSFILE. The file's R and S values, along with P,Q and G, and the User-supplied public key, are then passed on to the DSA signature verification routine. If there is no User-supplied public key, the public key from the active DSAKEYSFILE is used.

The DSAKEYSFILE is an unblocked file which consists of records whose maximum record size is 60 words in length. The general information record contains miscellaneous data about the file, for example: version, number of search table records, number of key entries, etc. This record is then followed by one or more search table records which in turn, contain a number of four word search entries. Following the search table records are the data records, with each containing a different set of [ID, software, public key, P, Q, G].

The main purpose of the DSAKEYSFILE is to store the P, Q, G primes used when creating public and private key pairs. It is also used to store frequently used public keys which are normally about 60 characters long, so the caller of "Unwrap" does not need to enter this character string every time an Unwrap process is requested on a digitally signatured file.

This procedure involves a further procedure entitled "GET_DSA_PQGKEY" which obtains the corresponding set of [P,Q,G, public key] from the active DSAKEYSFILE and returns that set to the caller.

FIG. 3, as previously mentioned is an illustration of a 1RAPPEDDATA file format which will be seen as a simple byte-stream file. This file shown in FIG. 3 will be seen to have a format of five different sections designated (i), designated (ii), (iii), (iv) and (v), as discussed earlier herein.

Since the present disclosure involves a multiple series of files held in a "container", which container consists of a multiplicity of byte stream files plus a directory of these files which are stored in the container and optionally a digital signature, then there is required a particular format for a container file to exist as a byte stream data file.

This is illustrated in FIG. 4, where the container file is organized in seven sections designated (i) through (vii).

The first section (i) contains the container identification designated CONTAINER ID. The second location (ii) is an indication of the directory location, while the third portion (iii) provides the container options and the container checksum.

The portion (iv) shows the wrapped files involved as byte stream data files. The section (v) is the directory identification—DIRECTORY ID.

The portion (vi) of FIG. 4 is a directory of file names and their various locations in the container. Portion (vii) is an optional portion for providing a digital signature.

NEW MODIFIERS: Two new File Data modifiers are added to allow SYSTEM/FILEDATA program (or utility) to report on the attribute information for WRAPPEDFILES and CONTAINERS.

A new WRAPPEDFILES modifier will report the internal file attributes of WRAPPEDFILES from Disk or CD-ROM.

A new CONTAINER modifier will report the internal file attributes of WRAPPEDFILES in a container from Disk or CD-ROM.

The CONTAINER and WRAPPEDFILES modifiers will be allowed with the: ATTRIBUTES; CODEFILEINFO; COMPATABILITY; INCOMPATABILITY; HEADER-CONTENTS; FILENAMES; NOREPORTS; COPYDECK REQUESTS.

WRAPPEDFILES: The WRAPPEDFILES modifier will only report on the file attributes of the internal native file within a file of FILEKIND=WRAPPEDFILE. Files that are not FILEXIND=WRAPPEDFILE will not be included in the report, or in subsequent reports using any database generated with the WRAPPEDFILES modifier.

WRAPPEDFILES are created as FILEKINDWRAPPEDDATA and all such files will automatically be accessed with the WRAP modifier.

WRAPPEDFILES can also be converted to a FILEKIND of DATA. All FILES on a CD-ROM will also be accessed automatically for the WRAP modifier, but not from DISK. An override is provided to allow access of the internal file attributes of a single file of FILEKIND DATA if the file is known, or suspected, to actually contain a WRAPPEDFILE by entering the full file name as the TITLE. This override will only function if the file is a file only, and not a "directory". The WRAPPEDFILES modifier is also available with the LFILE command from command and edit (CANDE, see Glossary item 12a) with the same restrictions.

FILEDATA ENHANCEMENTS: These include the (i) new modifiers; and (ii) WRLPPEDFILES and the subsets of these two items.

CONTAINER: The CONTAINER MODIFIER will use the DIRECTORY or title modifiers to select files out of the CONTAINER. When no TITLE or DIRECTORY is specified, the default then is to use an "=". If FILEDATA is run under a privileged usercode, then "*=" must be specified in order to see all the files in the container.

The FILEDATA program CALLS THE Master Control Program (MCP) to Unwrap the headers of the files in a CONTAINER or a WRAPPEDDATA file. The MCP may issue error messages. These messages will not appear in the report that FILEDATA prints. These can be found in a job summary.

ARCHIVEBACKUP, BACKUPSN, and CATALOGUE are invalid modifiers, and PPB (Program Parameter Block) is an invalid file attribute with WRAPPEDFILES and CONTAINER. Other invalid modifiers with CONTAINER are—GUARDFILE; LEVEL; NONRESIDENTONLY; RESIDENTONLY.

To report the contents of a WRAPPEDFILE, the user will enter:

LFILE MY/WRAPPED/FILE: WRAP ALL

To obtain a FILENAMES report of a CONTAINER, the user will enter:

Either

LFILE:CONTAINER=MY/CONTAINER/FILE

Or

LFILE *=: CONTAINER=MY/CONTAINER/FILE

Figure 5A:
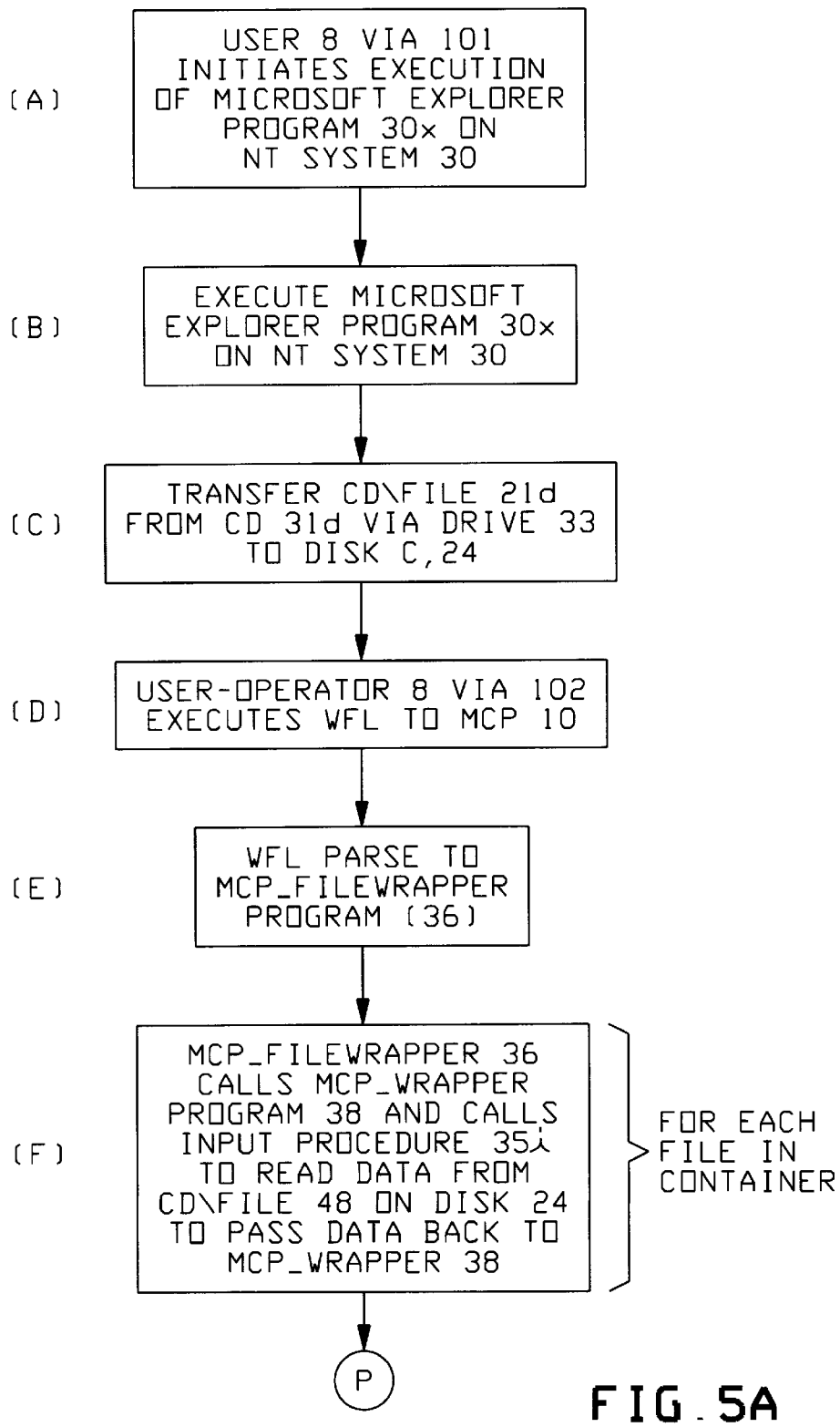
FIGS. 5A and 5B show the sequence of steps utilized to unwrap container of multiple files to reconstitute the original files with all their attributes for use of a particular platform.
Figure 5B:
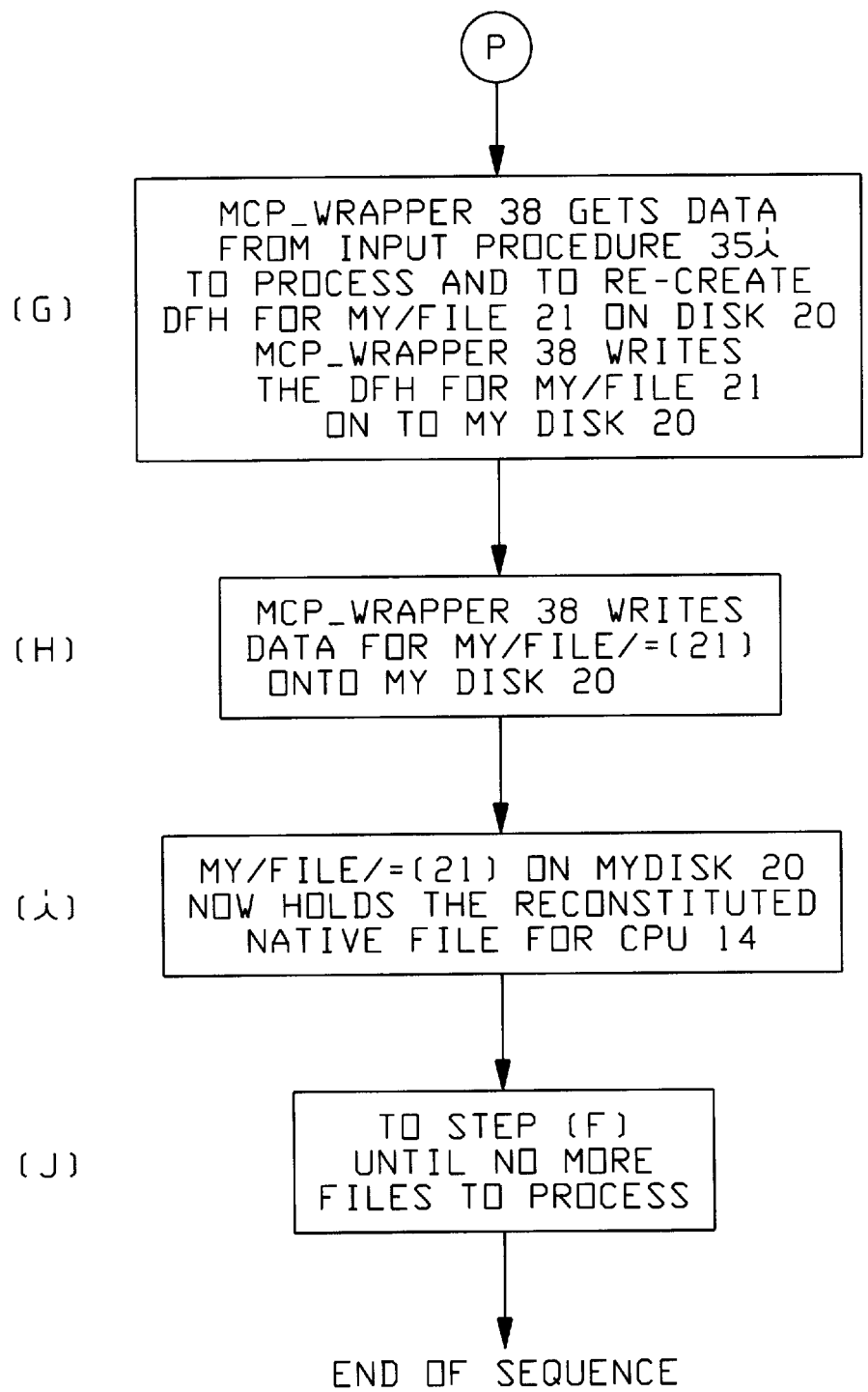

INTEGRATED NETWORK:

The integrated network of FIG. 1B shows a system where two platforms, such as the NT System 30 and the Unisys A-Series CPU 14 and Master Control Program 10 are integrated on a cooperative basis. In this particular network context, FIGS. 5A and 5B will illustrate a sequence of steps required to "Unwrap" or reconstitute the native files of a particular first computer platform, such as the Unisys A-Series computer system. Referring to FIGS. 5A and 5B, it will be seen that the following steps will be effectuated:

At step A, the User 8 via Channel 101 (FIG. 13) initiates execution of the Microsoft Explorer Program 30x on the NT system 30.

At step B, the Microsoft Explorer Program is executed on the NT system 30.

At step C, the CD\FILE (21d) is transferred from the Compact Disk 31d by means of Drive 33 over to the Disk C (24).

At step D, the User-operator 8 utilizing the Channel 102 (FIG. 1B) then executes the Work Flow Language Program to the MCP 10.

At step E, the Master Control Program (MCP) 10 accesses the internal program designated MCP_FILEWRAJPPER 36. This is a Parsing operation which breaks down code words into functional units that can be converted into machine language. Thus, this operation analyzes a sense or language statement and breaks down a natural language request into the commands required by a query language.

At step F, the MCP_FILEWRAPPER Program 36 calls the MCP_WRAPPER Program 38, and then calls the Input procedure 35i (FIG. 13) in order to Read data from the CD/FILE 48 on Disk 24 to pass data back to the program designated MCP_WRAPPER 38. This is done for each file in the Container.

Now continuing this sequence as indicated on FIG. 5B, it is seen that at step G, the program MCP_WRAPPER 38 gets data from the Input procedure 35i in order to process it and to recreate the Disk File Header for MY/FILE 21 on Disk 20 (FIG. 1B).

At step H, the program MCP_WAPPER 38 then Writes the data for MY/FILE/=(21) onto MYDISK 20.

At step I, the data of MY/FILE/=(21) on MYDISK 20 now holds the reconstituted native file for the CPU 14.

This would normally be the end of the sequence, unless there is another file to process, at which point, step J indicates that there is a feedback loop to step (F) if there is another file to process. If there is no other file to process, then this would constitute the end of the sequence.

ALGORITHMIC SEQUENCE FOR UNWRAPPING A BYTE-STREAM TEXT DATA FILE FROM COMPACT DISK:

This algorithmic sequence involves the unwrapping of a "single file" from a compact disk. (FIGS. 1A, 2A, 2B).

A. At terminal 8, the client user enters the U MY/FILE=(21) OUT OF CD/FILE (21d) from the CD Drive 33 over to MYDISK 20.

B. The WFL compiler 15 parses the command and passes information to the operating system 10 (O.S.) as MCP_FILEWRAPPER 36 procedure (input file title, output file title, unwrap action).

C. MCP_FILEWRAPPER 36:—verify file names, options (unwrap action) state.
   C1: Open input data file, CD/FILE (31d); verify Container; access directory; build list of files for each file.
   C2: Call MCP_WRAPPER 38 O.S. procedure passing the following three items:
      C2-1: Output file title.
      C2-2: Input procedure 35i to read the existing data file, CD\FILE 21d on CD-ROM 31d via the Drive 33.
      C2-3: Options (unwrap action).
   C3: Display result to User 8 and save result in Main Memory. If result is an error result, then exit program.

D. MCP_WRAPPER (38)
   D1: Verify output file names.
   D2: Call input Read procedure E (35i) to obtain WRAP_ID (Section i of FIG. 3) and the Options (Section ii of FIG. 3) information out of the data file. (Procedure E is indicated later below).
   D3: Verify that WRAP_ID is "UNISYS 000010" (note that these digits represent a particular version and are subject to change with new versions).
   D4: If the file is not a wrapped file, return an indicator that shows it is a data file (this return is sent to step C3), and then finish processing the file (exit).
   D5: The MCP_WRAPPER program will then call the input Read procedure E (35i) to get the rest or the remainder of the wrapped options as well as the first 18 bytes of the Disk File Header (DFH which is Section iii of FIG. 3) information for the wrapped file, CD\FILE 21d on CD-ROM 31d via the CD DRIVE 33.
   D6: Verify the options (as indicated in Section iii of FIG. 3).
   D7: The MCP_WRAPPER program 38 will then verify the DFH information as to its version, length, validity.
   D8: The program 38 then calls the input Read procedure 35i in order to get the remainder of the Disk File Header (DFH) and the DFH checksum (item iii of FIG. 3).
   D9: The program 38 will then verify the DFH checksum information.
   D10: The program 38 will begin calculating the running checksum (stored in an array in local memory 18) for the file.
   D11: The program 38 will use the Disk File Header (DFH) information that was previously obtained from reading CD\FILE 21d on the CD 31d via Drive 33; then the program will build a "new" system Disk File Header in local memory 18. The Disk File Header for the file will be created using the output file title (MY/FILE) and the disk volume location (MYDISK 20) that was specified in the WFL command.
   D12: Using the disk row address information obtained from the Disk File Header in local memory 18, the following procedures of D12-1 and D12-2 are used:
      D12-1: Call input Read procedure 35i to Read the input data file (CD\FILE 21d on CD 31d in the CD Drive 33) one row length at a time; then write out the information to a new output disk file (MY/FILE/=(21) on MY/DISK 20), one row at a time.
      D12-2: The MCP_WRAPPER program will continue calculating the running checksum in local memory 18 for each row of the file being processed.
   D13: Loop the operations of D12-1 and D12-2 until all data in the CD/FILE 21d which is on CD 31d in the CD Drive 33, is exhausted.
   D14: The MCP_WRAPPER program 38 will then call the input Read procedure 35i to obtain the stored checksum (item v of FIG. 3).
   D15: The program 38 will then verify that the stored checksum (item v of FIG. 3) matches the calculated running checksum that was set in the local memory 18.
   D16: If the checksums do not match, then return an error signal and exit.
   D17: Only if there is no error then:
      D17-1: Update additional system information and time stamps in the new Disk File Header in local memory 18.
      D17-2: Enter the header into the system directory on NMDISK 20.
   D18: Exit.

E. Input Read Procedure 35i (which is tasked to program 38 by program 36 and executed repeatedly by the program 38) is then used to:
   E1: Accept array, Read length.
   E2: Read input data (21 on disk 31d on CD Drive 33) that is the data file into array for the Read length.
   E3: If there is a Read error, then return negative value.
   E4: Exit.

Described herein has been a method and system for decoding or "Unwrapping" byte stream text files of a container, having multiple files and a directory, suitable for general network transmission, in order to convert those files of the Container to an original native format Container suitable for a particular computer system. While a preferred embodiment has been illustrated, it should be recognized that the invention is defined by the following claims.

What is claimed is:

1. In a computer platform which processes data files in an original specialized second format and which accesses a first format Container (CD\FILE) of data files and Directory organized as byte stream text files in a first format on a CD-ROM (31d), a method for re-creating original specialized second format files (MY/FILE/=) which duplicate the files and Directory information of said first format Container but is now organized in said second format, said method comprising the steps of:

(a) unwrapping said first format Container (CD\FILE, 21d) of files and Directory in said first format for processing by a first (36) and second (38) interface program;

(b) executing said first (36) and second (38) interface program on said first format Container to convert said first format Container (CD\FILE) into multiple second format original specialized files (MY/FILE/=,21) which restore the data into said original specialized second format.

2. The method of claim 1 wherein step (a) includes the steps of:

(a1) entering an UNWRAP command to a Master Control Program of said computer platform to call said first interface program (MCP_FILEWRAPPER) which then calls said second interface program (MCP_WRAPPER).

3. The method of claim 1 wherein said first interface program (36) includes the steps of:

(b1) opening said first format Container (CD\FILE, 21d) to verify it is a Container and to verify its checksum and its security privilege in order to access the files of said first format Container;

(b2) locating the Directory information in said first format Container;

(b3) locating each file of said first Container, via its directory location, to set up input and output file name pairs in main memory (18);

(b4) setting up input and output file names in main memory and setting up parameters for said second interface program (38);

(b5) calling said second interface program (MCP_WRAPPER).

4. The method of claim 1 wherein said second interface program (MCP_WRAPPER) includes the steps of:

(b6) converting each input file of said first format Container and its Directory into an output file in said second specialized format.

5. In a computer operating on a specialized original native file format with a Disk File Header (DFH) for each file, a system for accessing a CD-ROM holding a first format Container (CD\FILE) with industry standard byte stream data files and Directory of a first format and converting said first format to individual second format files compatible for said specialized original native file format, said system comprising:

(a) means for accessing said first format Container (21d) (CD\FILE) holding said byte stream files of first format;

(b) means to execute a first interface program (MCP_FILEWRAPPER, 36) which initiates an input read procedure (35i) to transfer said first format Container (21d, CD\FILE) to a second interface program (38);

(c) means to execute said second interface program (MCP_WRAPPER, 38) to re-create said first format Container (21d) into resultant multiple native second format files (MY/FILE/=(21).

6. The system of claim 5 wherein said first interface program includes:

(b1) means to open an input data file in said first format Container (CD\FILE, 21d);

(b2) means to read said first format Container ID to verify that input file is a Container;

(b3) means to verify said first format Container checksum;

(b4) means to verify that User has proper security privilege to access data in said first format Container;

(b5) means to locate each file of said first format Container via said Directory and to set up, in local memory (18), input and output file name pairs for each file;

(b6) means to call said second interface program (38, MCP_FILEWRAPPER) for each file to be converted (unwrapped).

7. The system of claim 5 to wherein said second interface program (38) includes:

(c1) means to verify each output file name and call said input Read procedure (35i) and verify option information for each data file in said first format Container (CD\FILE 21d);

(c2) means to verify that each said data file in said first format Container is a "wrapped" file in said first byte stream format;

(c3) means to call said input procedure (35i) to access the Disk File Header (DFH) of each data file of said wrapped file;

(c4) means to verify the options selected and to verify the DFH information for said wrapped file.

(c5) means to call an input procedure (35i) to complete the access of the DFH and DFH checksum for each said data file;

(c6) means to calculate the running checksum located in local memory for each said data file;

(c7) means for creating a new system Disk File Header as an output file for placement in local memory (18);

(c8) means to use said input read procedure (35i) to read each input data file of said first format Container and then write an output file (MY/FILE 21) on disk (20, MYDISK);

(c9) means to calculate the running checksum in local memory (18) for each row of each file being processed within said first format Container (CD\FILE);

(c10) means to convert each input file of said first format Container (CD\FILE) to an output file of said second specialized format Container (MY/FILE/=) (21);

(c11) means to obtain the stored checksum of the entire first format Container (CD\FILE, 21d) for comparison to the calculated running checksum that was set in local memory (18);

(c12) means to exit the interface program (38) when the checksums match or to send an error signal if the checksums do not match.

8. In an integrated network holding first (14) and second (30) platform means each using respectively a first and second format, each said format being a different file format from the other and wherein said first platform means utilizes an original native data file of first format, and said second platform means (30) utilizes an industry standard byte stream data file of second format, a system for converting a second format Container (CD\FILE, 21d) of said second format files and directory from a CD-ROM (31d) into said original native data files in said first format for said first platform means, said system comprising:

(a) means (31d, 33), in said second platform (30) means, for accessing said second format Container (CD\FILE, 21d) holding said second format files and transferring said second format Container to a shared disk means (24);

(b) said shared disk means (24) utilized by said first (14) and second (30) platform means for holding said second format Container (48) of said second format files (CD/FILE 48);

(c) program means (36,38) for converting said second format Container (48) of second format files into separate original native first format files compatible for said first platform means.

9. The system of claim 8 where each said first format and second format Container includes:

(a) a Container ID;

(b) a location address for a directory;

(c) a checksum for the Container;

(d) a set of data files;

(e) a directory ID;

(f) a directory of file names with a locational address for each file in the Container.

10. The system of claim 8 wherein each file of each said set of data files in said second format Container includes:

(d1) a Disk File Header; and (d2) a Disk File Header checksum; and (d3) native first platform files represented as standard byte stream files.

11. The system of claim 8 wherein said means for accessing said second format Container (CD\FILE, 21*d*) for transfer to a shared disk means (24) includes:

(a1) a Microsoft Explorer program (30*x*) for dragging said Container (CD\FILE,21*d*) to said shared Disk (C,24).

12. The system of claim 8 wherein said program means (36,38) includes:

(c1) first interface program means (MCP_FILEWRAPPER 36) to read out said second format Container (CD/FILE 48) on shared Disk C (24) for transfer to a second interface program (38);

(c2) said second interface program (38, MCP_WRAPPER) for converting said second format Container (CD/FILE 48) of second format files into a first format Container of first format files suitable for utilization by said first platform means.

13. The method of claim 12 wherein said second interface program (38) (MCP_WRAPPER) includes the steps of:

(b5) executing an input procedure (35*i*) of said program (38) to re-create said first format files in said original specialized first format compatible for said first platform means.

* * * * *